Patented Mar. 20, 1928.

1,663,454

UNITED STATES PATENT OFFICE.

HENRY JORDAN, OF WILMINGTON, DELAWARE, ASSIGNOR TO E. I. DU PONT DE NEMOURS & COMPANY, OF WILMINGTON, DELAWARE, A CORPORATION OF DELAWARE.

TRISAZO DYES FOR COTTON AND PROCESS OF MAKING THE SAME.

No Drawing.    Application filed August 10, 1926. Serial No. 128,519.

This invention relates to trisazo dyes for cotton and to the method of preparing the same. More particularly it is concerned with improved blue and gray dyes and their preparation by coupling a diazo compound of the benzene or naphthalene series not containing a free hydroxyl group to an alpha-amino naphthalene compound without a free hydroxyl group, diazotizing the intermediate amino azo dye, coupling it again to the same or another alpha-amino naphthalene compound, then diazotizing the resulting disazo compound and finally coupling it to acidyl 2-amino-8-naphthol-6-sulphonic acid.

One of the objects of the invention is to provide a blue to gray cotton dye having a superior fastness to light. Another object is to provide a blue to gray azo dye with a marked affinity for cotton and adapted for direct application thereto.

The new dyes have the general formula:
$R_1$—N=N—$R_2$—N=N—$R_3$—N=N—$R_4$
$R_1$ representing a benzene or naphthalene derivative without a free hydroxyl group, $R_2$ and $R_3$ representing naphthalene derivatives without a free hydroxyl group and $R_4$ representing an acidyl 2-amino-8-naphthol-6-sulphonic acid.

The new dye compounds and their preparation can best be disclosed by the presentation of a number of examples of actual embodiments thereof. It is to be understood, of course, that these examples are furnished below by way of illustration only, and that the details of procedure specified therein, as well as the particular proportions, reagents, temperatures, etc., therein disclosed are susceptible of variation and substitution.

The examples follow:

Example 1.

173 parts of para sulphanilic acid are diazotized in the normal way and coupled to 223 parts of mixed Cleves acid in the presence of a quantity of sodium acetate sufficient to neutralize the mineral acid reaction. The coupling temperature should be 15–20° C. After about one hour's stirring hydrochloric acid is added in a sufficient amount to diazotize with 69 parts of sodium nitrite. The temperature of the diazo should be 15–20°. After about 40 minutes stirring the diazotization will be complete and there is added now a soluton of 143 parts of alpha naphthylamine in 2500 parts of water and 150 parts of a 31% hydrochloric acid solution, keeping the temperature of the coupling at about 20°. The mixture is stirred about 12 hours when the coupling will be complete. It is heated to 70°, salted out and filtered. The acid paste is stirred up with 6000 parts of water, heated to 70°, converted to the sodium salt by addition of sodium hydroxide. 69 parts of sodium nitrite are added to the solution, and then the mixture is run into a hydrochloric acid solution containing enough ice to keep the temperature below 10° C. There must be sufficient hydrochloric acid to keep the reaction mineral acid. After ½ hour's stirring the diazotization is run into a solution of 281 parts of 2-acetyl-amino-8-naphthol-6-sulphonic acid, containing enough soda ash to keep the reaction alkaline until the end of the coupling. The coupling is then heated to 80°, salted out and filtered. In its dry ground form it is a dark powder with a bronzy lustre, soluble in water with a bluish-violet color, in concentrated sulfuric acid with a greenish gray color. It dyes cotton in bluish gray shades, which show a good fastness to washing and an excellent fastness to light. The dyeings give a perfect white discharge with hydrosulphite. On mixed cotton-silk fibres dyed from a neutral Glauber salt bath it leaves the silk practically unstained. The new dye will have the following formula:

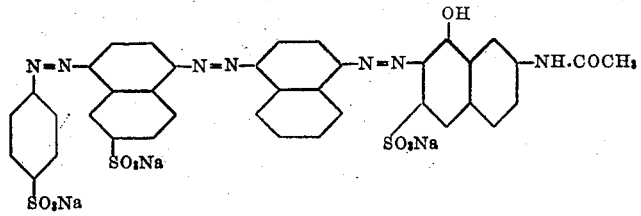

On reducing the dye with stannous chloride the following compounds will be obtained:

p-sulphanilic acid, 1-4 naphthylene diamine-6-sulphonic acid, 1-4 naphthylene diamine, 2-acetyl amino-7-amino-8-naphthol-6-sulfonic acid.

*Example 2.*

Substituting in Example 1 the 173 parts of p-sulphanilic acid by 303 parts of 2-naphthylamine-6-8-disulfonic acid and having all other conditions the same, a dye is obtained of similar properties as the one in Example 1, the solution in water being of a bluish gray coloration, soluble in concentrated sulfuric acid with a bluish green color dyeing cotton a trace greener than the dye in Example 1.

This dye will yield on reduction with stannous chloride the same compounds as those mentioned in Example 1, except instead of p-sulphanilic acid, 2-naphthylamine-6-8-disulfonic acid is obtained.

Using 2-benzoyl amino-8-naphthol-6-sulfonic acid instead of the acetyl compound a slightly redder shade gray is obtained.

*Example 3.*

Using in Example 2 as second component alpha naphthylamine instead of Cleves acid and as third component 1-6-Cleves acid instead of alpha naphthylamine, leaving all other conditions the same, a dye is obtained which dyes cotton in blue shades, having similar properties as the gray dye of Example 2.

On reduction with stannous chloride, this dye will yield the same compounds as in Example 2.

As first components, other diazotizable compounds of the benzene or naphthalene series may be used, as for instance, aniline, o-toluidine, m-toluidine, p-toluidine, xylidine, o-anisidine, metanilic acid, amino benzoic acid, 1-4, 1-5, 1-6, or 1-7-naphthylamine sulfonic acid, or other alpha or beta naphthylamine mono- or disulfonic acids, etc.

As second components, in addition to alpha-naphthylamine and Cleve's acid, there may be used, for example, derivatives of these compounds not having a free hydroxy group, such as 1-amino-2-naphthol ether or its 6 or 7 sulphonic acid.

By the term "free hydroxy group" as employed throughout the specification, I mean a hydroxy group attached to the nucleus. Consequently a compound not containing a free hydroxyl group is a compound having no hydroxyl group attached to the nucleus of the same.

When "Cleve's acid" is referred to in the claims, I intend to designate either 1:6 naphthyl-amine-sulfonic acid or 1:7 naphthylamine-sulfonic acid or a mixture of both.

By suitably varying the components and using appropriate proportions and conditions, a large number of valuable blue to gray trisazo dyes for cotton may be prepared. These dyes are all characterized by an unusual affinity for cotton and an excellent fastness to light. They are adapted for direct application by the ordinary methods.

I claim:

1. The process of producing a trisazo dye which comprises coupling an aryl diazo compound having no free hydroxy group to an alpha-amino-naphthalene compound having no free hydroxy group, diazotizing the resulting amino azo intermediate, coupling the resulting diazo azo compound to a second alpha-amino-naphthalene compound having no free hydroxy group, diazotizing the resulting disazo compound and finally coupling to a 2-acyl-amino-8-naphthol-6-sulphonate.

2. The process of producing a trisazo dye which comprises coupling a diazo-azo-naphthalene compound having no free hydroxy group to an alpha-amino-naphthalene compound having no free hydroxy group, diazotizing the resulting disazo compound and finally coupling to a 2-acyl-amino-8-naphthol-6-sulphonate.

3. The process of producing a trisazo dye which comprises coupling a diazo disazo compound having no free hydroxy group to 2-acyl-amino-8-naphthol-6-sulphonate.

4. The process as set forth in claim 1 wherein the acyl-amino-naphthol sulfonic acid is 2-acetyl-amino-8-naphthol-6-sulphonate.

5. The process set forth in claim 1 wherein the first amino-naphthalene compound is Cleve's acid.

6. The process set forth in claim 1 wherein the second amino-naphthalene compound is alpha-naphthylamine.

7. The process set forth in claim 1 wherein the aryl diazo compound is the diazo compound of 2-naphthylamine-6-8-disulphonic acid.

8. A compound having the general formula:

$$R_1-N=N-R_2-N=N-R_3-N=N-R_4$$

in which $R_1$ represents an aryl radical having no free hydroxl group, $R_2$ and $R_3$ represent naphthalene derivatives without a free hydroxyl group, and $R_4$ represents a 2-acyl-amino-8-naphthol-6-sulphonate.

9. A compound having the general formula:

$$R_1-N=N-R_2-N=N-R_3-N=N-R_4$$

in which $R_1$ represents an aryl radical having no free hydroxyl group, $R_2$ and $R_3$ represent naphthalene derivatives without a free hydroxyl group and $R_4$ represents a 2-acyl-amino-8-naphthol-6-sulphonate.

10. The compound set forth in claim 8 wherein $R_1$ represents a sulfonated benzene or naphthalene group.

11. The compound set forth in claim 8 wherein $R_1$ represents a naphthalene 6-8-disulphonic acid group.

12. The compound set forth in claim 8 wherein $R_2$ represents a sulfonated naphthalene group.

13. The compound set forth in claim 8 wherein $R_3$ represents a naphthalene radical having no substituents other than the azo groups.

14. A textile material dyed with the compound set forth in claim 8.

In testimony whereof I affix my signature.

HENRY JORDAN.